United States Patent [19]

Brown et al.

[11] Patent Number: 5,340,125
[45] Date of Patent: Aug. 23, 1994

[54] GASKET FOR RADIALLY SPACED PIPES

[76] Inventors: Richard C. Brown, 336 Carthage Ave., Eugene, Oreg. 97404; Gary J. Oldham, 86466 Lorane Hwy., Eugene, Oreg. 97405

[21] Appl. No.: 962,973

[22] Filed: Oct. 16, 1992

[51] Int. Cl.⁵ ............................................. F16J 15/16
[52] U.S. Cl. .................. 277/169; 277/207 A
[58] Field of Search ............... 277/169, 207 A, 208; 285/110, 111

[56] References Cited

U.S. PATENT DOCUMENTS

| | | |
|---|---|---|
| 1,945,293 | 1/1934 | Pierce. |
| 3,315,970 | 4/1967 | Holloway ...................... 277/169 X |
| 3,386,745 | 6/1968 | Hein ................................ 277/207 A |
| 4,572,523 | 2/1986 | Guettouche et al. .......... 277/207 A |
| 5,213,339 | 5/1993 | Walworth ................... 277/207 A X |

FOREIGN PATENT DOCUMENTS

| | | | |
|---|---|---|---|
| 283729 | 9/1988 | European Pat. Off. ............ 285/111 |
| 1275980 | 10/1961 | France ............................... 285/111 |
| 904622 | 8/1962 | United Kingdom ................ 285/110 |
| 1165431 | 10/1969 | United Kingdom ................ 285/111 |
| 1353929 | 5/1974 | United Kingdom ................ 277/169 |
| 2071230 | 9/1981 | United Kingdom ........... 277/207 A |

Primary Examiner—William A. Cuchlinski, Jr.
Assistant Examiner—Scott W. Cummings
Attorney, Agent, or Firm—James D. Givnan, Jr.

[57] ABSTRACT

A gasket including a main body of circular shape having both inwardly and outwardly directed lips for sealing engagement with the radially spaced pipes of an irrigation system. System water pressure directly biases certain of the lips towards pipe engagement. A lubricant is applied and cured by heating of the gasket.

5 Claims, 1 Drawing Sheet

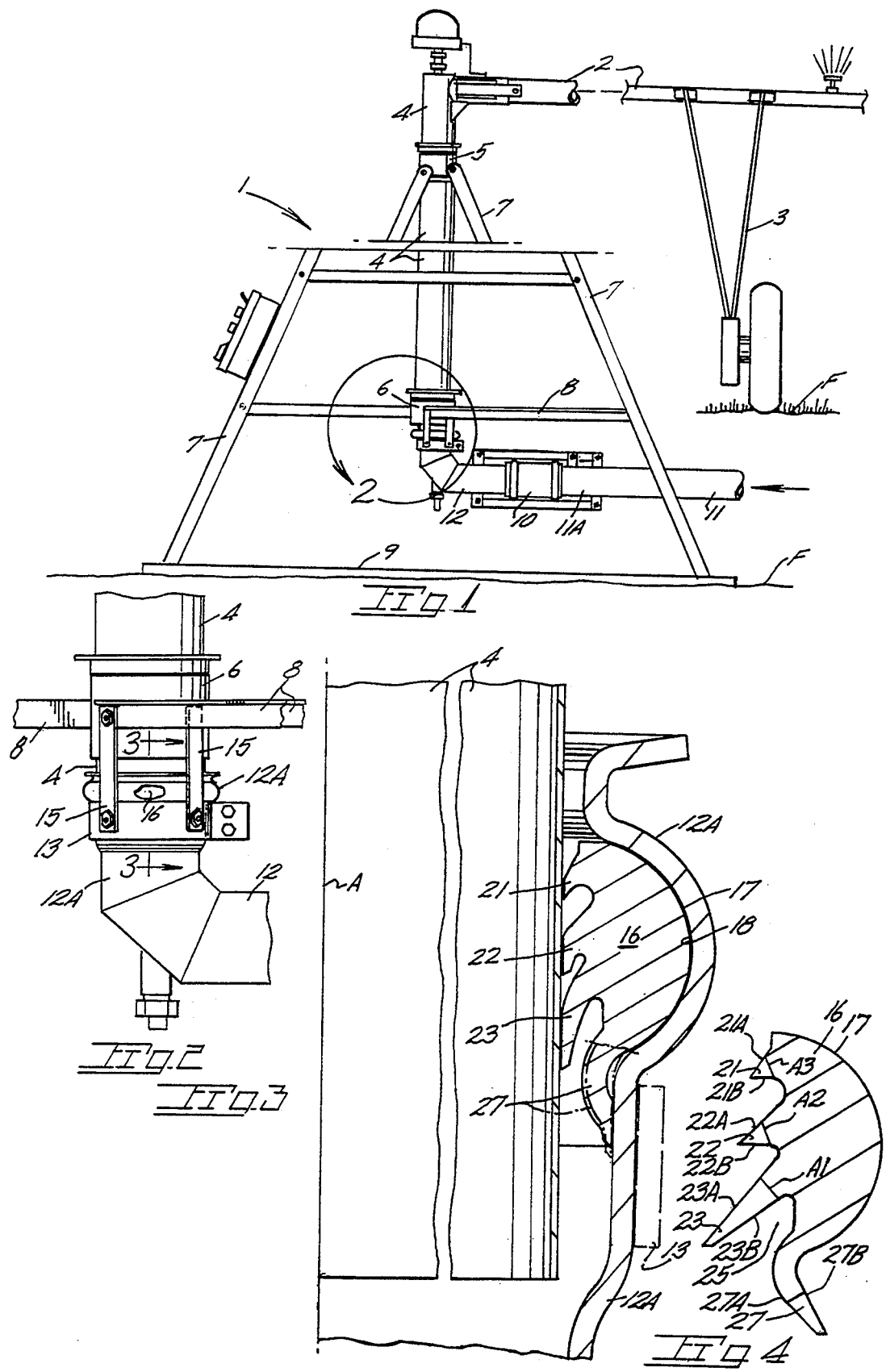

GASKET FOR RADIALLY SPACED PIPES

BACKGROUND OF THE INVENTION

The present invention concerns generally the sealing of the connection of radially spaced pipes.

In center pivot farm irrigation systems a centrally located pivot structure may include a fixed pipe elbow having an upper end in communication with a vertically disposed pipe which rotates about a vertical axis as the several towers and the horizontal distribution pipe carried thereby swing about the field being irrigated. The tower carried horizontal delivery pipe is equipped with spaced apart nozzles. During system operation previous gaskets between the rotating and fixed concentric pipes were subject to leaking. A study of the problem of leakage indicated that it was occuring between the outer or back surface of the gasket and the outer or fixed pipe in which the gasket was installed. Prior gaskets for such a use included the chevron shaped gasket having a single annular lip of tapered configuration viewed in section.

In the development of the present gasket consideration was given to resistance to abrasion from sand and other particles in well water supplied to the irrigation system, extreme temperatures, exposure to chemicals added to irrigation system water and pressures ranging from 10 psi to 120 psi.

SUMMARY OF THE PRESENT INVENTION

The present invention is embodied in a pipe gasket having multiple lips for flexed engagement with both radially spaced pipes.

The present gasket includes a main body of an elastomeric material having multiple annular lips projecting inwardly for contact with the outer wall of a rotating pipe of the irrigation system pivot structure. The lips are deformed somewhat upon assembly of the rotating and fixed pipes. Each of the above lips contacts a separate circumferential surface area of the inner or rotating pipe to provide several sealing areas thereon. An additional gasket lip is located at the upstream end of the present gasket and is of a pliable nature to permit outward lip displacement by water pressure for sealing engagement with the stationary outer pipe. Accordingly a seal is provided which stops leakage past the back or outside of the gasket and the stationary pipe in which it is mounted. To increase the life of the three inwardly directed lips the same are provided with a fluoropolymer coating applied during gasket manufacture.

Important objects of the present gasket include the provision of a gasket for use in center pivot irrigation systems to block seepage occuring between large diameter pipes at both low and high pressures during rotational movement between said pipes; the provision of a gasket including multiple inner lips of nonuniform cross-section and an outwardly flared lip urged by water pressure into sealing engagement with a surface of a pipe to block leakage past the gasket; the provision of a gasket having multiple, inwardly directed lips of non-uniform cross section which are deformed by an inserted pipe member so as to provide a series of annular, axially spaced sealed areas on the pipe.

BRIEF DESCRIPTION OF THE DRAWINGS

In the drawings:

FIG. 1 is an elevational view of a center pivot structure for a field irrigation system of the center pivot type;

FIG. 2 is an enlarged fragmentary view of that portion of the center pivot structure encircled at 2 in FIG. 1;

FIG. 3 is a vertical sectional view taken along line 3-3 of FIG. 2 and showing the present gasket in typical cross section; and FIG. 4 is a vertical cross section of the present gasket removed from supporting structure and shown in its relaxed state.

DETAILED DESCRIPTION OF THE PREFERRED EMBODIMENTS

With continuing attention to the drawings wherein the reference numeral 1 indicates generally the center pivot structure of a field irrigation system including a generally horizontally distribution pipe 2 of considerable length and supported by a series of motorized, wheel supported towers as at 3 for travel in a circular manner about the center pivot structure over a field at F.

Distribution pipe 2 is served by an upright, rotatable pipe 4 suitably journalled in bearing rings at 5 and 6 carried by leg 7 and components 8 of the center pivot structure. Legs 7 of the center pivot structure rest on a concrete slab 9. A coupler 10 mounts about an end segment 11A of a water supply pipe 11. A pipe elbow is at 12, the upper end of which at 12A is carried by hangers 15 and collar 13. The collar 13, supporting fixed pipe elbow 12A and the bearing ring 6 (for pipe 4) are in axially alignment for concentric positioning of the upper bell end 12A of the elbow and the lower end of rotating pipe 4 therein. The foregoing description is intended to be more or less typical of a center pivot structure for a center pivot irrigation system.

With attention now to the present gasket, main body is at 16 having an outwardly disposed back side or outer wall at 17 in abutment with an annular recess 18 found in the bell portion 12A of pipe elbow 12. Inner lip means include inwardly directed annular lips 21, 22 and 23 of the gasket and project inwardly to the extent the same firmly engage and are deformed by the installation of the lower end of rotating pipe 4 into the elbow bell portion 12A. As best shown in FIG. 4 the lips each have convergent surfaces 21A-21B; 22A-22B; and 23A-23B to provide tapered lips as viewed in section. The lips have distal end segments which flex to apply multiple surface areas in wiping contact with rotating pipe 4. The lip surfaces 23A-23B define an included angle of 15° at A1 in a preferred embodiment of the gasket while the remaining lip surface 21A-21B and 22A-22B define included angles at A2 and A3 of approximately 45°–50° in a preferred embodiment of the gasket. The apices of the convergent lips permit flexing of the lip inner extremities to the extent surfaces 21A, 22A and 23A flex into surface contact with pipe 4. An area 25 outward of lip 23 is charged with water at system operating pressure to effect inward biasing of the lip toward pipe 4 to enhance sealing contact therewith.

With continuing attention to the gasket and particularly to an upstream disposed end lip at 27, shown in its relaxed state in FIG. 4, has inner and outer surfaces 27A-27B with respect to the gasket axis at A with the surfaces being convergent to provide an outwardly tapering cross-section responsive to water pressure and which assumes the broken line position of FIG. 3 upon installation. Accordingly any leakage is prevented between elbow recess 18 and the gasket back side at 17. To ensure sealing engagement with bell portion 12A of elbow 3, the end lip 27 is flared outwardly and downwardly in an upstream directly to position a distal end portion of the lip in an inclined manner. The lip is responsive to water pressure by reason of its shape and pliable nature to contribute to sealing contact with the bell 12A of the pipe elbow.

A suitable material for the gasket is a rubber compound from the EPDM family with a durometer rating of 55–60. A fluoropolymer lubricant is applied to these surfaces of the gasket contactible with the rotatable inner pipe and the gasket then baked to cure the lubricant coating.

While we have shown and described but one embodiment of the invention, it will be apparent to those skilled in the art that the invention may be embodied still otherwise without departing from the spirit and scope of the invention.

Having thus described the invention, what is desired to be secured by a Letters Patent is:

We claim:

1. A gasket for installation between radially spaced inner and outer pipes in fluid communication between which rotational movement occurs, said gasket including, a main body of semi-circular cross-sectional shape and of elastomeric material for installation in said outer pipe, inner lip means on said main body including multiple lips projecting toward the axis of said main body for contact with the inner pipe of said pipes, each of said lips having convergent surfaces defining an included angle, one of said lips defining an included angle of lesser magnitude and having a greater radial component than the remaining multiple lips to provide a greater pipe contacting surface than the pipe contacting surfaces of the remaining multiple lips, said main body having an upstream end and a downstream end, and an outwardly flared lip at all times spaced from said multiple lips and carried by the upstream end of said main body, said flared lip extending in an axial direction from said main body and having a distal end portion for contact with the outer pipe of said pipes to prevent fluid passage between said main body and said outer pipe.

2. The gasket claimed in claim 1 wherein the outwardly flared lip is tapered in cross-section and in use biased outwardly toward said outer pipe by fluid pressure.

3. The gasket claimed in claim 1 wherein said one of said multiple lips is biased by fluid pressure towards the axis of said circular main body for contact with inner pipe of said pipes.

4. The gasket claimed in claim 1 additionally including a fluropolymer lubricant coating in place on said lips to permit requisite biased contact of the lips with the inner pipe without damage to the lips during rotation of the inner pipe.

5. A gasket of elastomeric material for installation between inner and outer pipes between which rotational movement occurs, said gasket comprising, a main body of semi-circular cross-sectional configuration for installation in said outer pipe, lip means on said main body including multiple annular inner lips each having convergent surfaces, said lips for contact with the inner pipe of said pipes, said lips of non-uniform cross-section, one of said lips having a surface for direct exposure to fluid pressure for the biasing of said one of said lips toward said inner pipe for sealing purposes, an outwardly flared lip on said main body and extending in an axial direction therefrom and having an outer surface for contact with said outer pipe and having an inner surface for direct exposure to fluid pressure in said outer pipe for biasing of the outwardly flared lip toward the outer pipe for sealing purposes, said flared lip having convergent surfaces to provide a lip of tapered cross-section, said outwardly flared lip terminates at a distal edge having in an unbiased state a diameter greater than the inside diameter of said outer pipe to assure contact of the distal edge with the said outer pipe during gasket installation, and a fluropolymer lubricant coating in place on said lips to permit requisite biased contact of the lips with the inner pipe without damage to the lips during rotation of the inner pipe.

* * * * *